US012160095B2

(12) United States Patent
Borisov et al.

(10) Patent No.: US 12,160,095 B2
(45) Date of Patent: Dec. 3, 2024

(54) DETECTING ELECTRICAL ARCING IN HOUSEHOLD ELECTRICAL WIRING

(71) Applicant: ITRON, INC., Liberty Lake, WA (US)

(72) Inventors: Vladimir Borisov, Seneca, SC (US); Matthieu Pichot, Paris (FR)

(73) Assignee: ITRON, INC., Liberty Lake, WA (US)

( * ) Notice: Subject to any disclaimer, the term of this patent is extended or adjusted under 35 U.S.C. 154(b) by 0 days.

(21) Appl. No.: 18/151,075

(22) Filed: Jan. 6, 2023

(65) Prior Publication Data

US 2023/0148196 A1 May 11, 2023

Related U.S. Application Data

(63) Continuation of application No. 16/688,989, filed on Nov. 19, 2019, now Pat. No. 11,552,465.

(51) Int. Cl.

*H02H 3/46* (2006.01)
*H02H 1/00* (2006.01)
*H02H 3/28* (2006.01)

(52) U.S. Cl.

CPC ............ *H02H 1/0015* (2013.01); *H02H 3/28* (2013.01); *H02H 3/46* (2013.01)

(58) Field of Classification Search

CPC ........... H02H 1/0015; H02H 3/28; H02H 3/46

See application file for complete search history.

(56) References Cited

U.S. PATENT DOCUMENTS 4,466,071 A * 8/1984 Russell, Jr. .............. H02H 3/52 324/520
5,223,795 A 6/1993 Blades
5,600,526 A 2/1997 Russell et al.
5,835,321 A 11/1998 Elms et al.
6,453,248 B1 * 9/2002 Hart ..................... G01R 31/088 702/58
7,463,037 B2 12/2008 Henson et al.
7,864,492 B2 1/2011 Restrepo et al.
9,594,107 B1 3/2017 Lawton et al.
9,733,294 B2 8/2017 Shuey et al.

(Continued)

FOREIGN PATENT DOCUMENTS

EP 1 005 128 B1 11/2010
EP 3 121 610 B1 10/2019

(Continued)

OTHER PUBLICATIONS

Extended European Search Report for Application No. 20890910.1 dated Feb. 26, 2024.

(Continued)

*Primary Examiner* — Scott Bauer

(74) *Attorney, Agent, or Firm* — Artegis Law Group, LLP

(57) ABSTRACT

Various embodiments disclosed herein provide techniques for detecting electrical arcing in an electrical system. The techniques include a network device receiving first voltage or current readings associated with a first power cycle, receiving second voltage or current readings associated with a second power cycle, determining that an electrical arcing condition is present by comparing the first voltage or current readings with the second voltage or current readings, and performing a remedial operation in response to determining that the electrical arcing condition is present.

19 Claims, 11 Drawing Sheets

(56) References Cited

U.S. PATENT DOCUMENTS

| | | | | |
|---|---|---|---|---|
| 10,161,983 | B2 | 12/2018 | Kraus et al. | |
| 2008/0061793 | A1 | 3/2008 | Anwar et al. | |
| 2009/0079436 | A1* | 3/2009 | Kojori | H02H 1/0015 324/520 |
| 2009/0187344 | A1 | 7/2009 | Brancaccio et al. | |
| 2009/0228223 | A1* | 9/2009 | Liu | G01R 31/008 361/62 |
| 2010/0157488 | A1* | 6/2010 | Hall | H02H 1/0015 361/42 |
| 2014/0327449 | A1 | 11/2014 | Shuey et al. | |
| 2016/0224083 | A1 | 8/2016 | Dent et al. | |
| 2017/0170782 | A1 | 6/2017 | Yoscovich et al. | |
| 2018/0188307 | A1 | 7/2018 | Logvinov et al. | |
| 2019/0339319 | A1 | 11/2019 | Jakupi | |

FOREIGN PATENT DOCUMENTS

| | | | |
|---|---|---|---|
| KR | 101574716 | B1 | 12/2015 |
| WO | 03/003324 | A1 | 1/2003 |

OTHER PUBLICATIONS

Partial European Search Report for application No. 20890910.1 dated Dec. 4, 2023.

* cited by examiner

DETECTING ELECTRICAL ARCING IN HOUSEHOLD ELECTRICAL WIRING

CROSS-REFERENCE TO RELATED APPLICATIONS

The present application is a continuation of United States application titled "DETECTING ELECTRICAL ARCING IN HOUSEHOLD ELECTRICAL WIRING," filed on Nov. 19, 2019, and having Ser. No. 16/688,989. The subject matter of this related application is hereby incorporated herein by reference.

BACKGROUND

Field of the Various Embodiments

The various embodiments relate generally to residential electrical systems and, more specifically, to detecting electrical arcing in household electrical wiring.

DESCRIPTION OF THE RELATED ART

Electrical failures or malfunctions resulting from electrical arcing are a leading cause of fires in households and other building structures. Electrical arcing is characterized by an electric arc that produces a prolonged electrical discharge. There are several types of electrical arcing. Parallel arcing occurs when the line wire is shorted to the neutral wire and can occur when the insulating medium surrounding electrical wiring breaks down. Parallel arcing typically trips a circuit breaker, which cuts off electricity to the circuit where the parallel arcing occurred. Similarly, ground arcing occurs when the line wire is shorted to the ground wire, which typically trips a ground fault circuit interrupter (GFCI). Series arcing occurs in series with a load and can occur when wired or plugged connections to an electrical outlet deteriorate over time. Series arcing can be more difficult to detect than parallel or ground arcing and often does not trip a circuit breaker. As a result, series arcing may occur over an extended period of time without being detected. The high temperatures normally associated with electrical arcing can cause related electrical fires that, in turn, can result in significant property damage and personal injury or death.

In order to prevent fires caused by electrical arcing, certain electrical codes, such as the National Electrical Code (NEC), require arc fault circuit interrupters (AFCIs) to be installed on certain branch circuits in residential households. Most AFCIs are designed as circuit breakers that can be installed in an electrical panel within a household. Each such AFCI-type circuit breaker is designed to protect one or more electrical household components serviced by the branch circuit connected to the AFCI-type circuit breaker. When an AFCI-type circuit breaker detects an electric arc in the branch circuit to which the circuit breaker is connected, the circuit breaker trips, thereby reducing the likelihood that the electric arc is able to generate a temperature high enough to start a fire.

One drawback with AFCI-type circuit breakers is that each such circuit breaker is designed to protect only one branch circuit. Further, AFCI-type circuit breakers are typically more expensive than standard circuit breakers. In order to save costs, a homeowner typically chooses to install AFCI-type circuit breakers only on those specific branch circuits for which electrical regulations require AFCI-type circuit breakers and to install standard circuit breakers on the remaining branch circuits within the household. Consequently, electrical arcs are detectable only on a subset of branch circuits within the household. In addition, older households that were built prior to the electrical regulations requiring AFCI-type breakers typically have no AFCI-type circuit breakers at all.

Another drawback with AFCI-type circuit breakers is that such circuit breakers are usually designed to detect only certain types of electrical arcs. For example, in order to avoid false triggers, some AFCI-type circuit breakers are typically designed to detect only sudden, high-magnitude electrical arcing. However, certain electrical arcing conditions develop slowly over time, such as when wire insulation or the electrical components within an electrical outlet deteriorate over time. Generally speaking, AFCI-type circuit breakers are not designed to detect these more gradual electrical arcing conditions. Accordingly, certain types of electrical arcing can cause electrical fires, even on branch circuits that are protected with AFCI-type circuit breakers.

As the foregoing illustrates, what is needed in the art are more effective ways of detecting electrical arcing in electrical wiring.

SUMMARY

Various embodiments include a computer-implemented method for detecting electrical arcing in an electrical system. The method includes acquiring, via a first power line communications (PLC) modem, first voltage readings associated with an electrical circuit, where the first voltage readings include high-frequency components associated with a line voltage. The method further includes performing one or more operations based on the first waveform data to determine that an electrical arcing condition is present within the electrical circuit. The method further includes performing a remedial operation in response to determining that the electrical arcing condition is present.

Other embodiments include, without limitation, one or more non-transitory computer-readable media storing instructions for performing one or more aspects of the disclosed techniques, as well as a system for performing one or more aspects of the disclosed techniques.

At least one technical advantage of the disclosed techniques relative to the prior art is that electrical arcing can be detected for an entire site, such as a household or other building structure, from a single location. Thus, with the disclosed techniques, a residence or other building structure can be protected from electrical arcing without having to replace all circuit breakers within the structure with AFCI-type circuit breakers. Another technical advantage relative to the prior art is that, with the disclosed techniques, is that, by analyzing a frequency spectrum derived from voltage readings over sequential time periods, electrical arcing conditions that develop slowly over time can be detected. By contrast, conventional current-based arc-fault circuit interrupters only detect only sudden, high-magnitude electrical arcing and are unable to analyze such long-term electrical arcing conditions. These technical advantages represent one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

As further described herein, a site, such as a residential household or other structure, includes one or more network communications devices, typically in the form of an electrical meter. In general, a residential household includes a single network communications device. However, any given site may include any technically feasible number of network communications devices, within the scope of the disclosed embodiments. Network communications devices communicate with one another via power line communications (PLC). PLC enables the network communications device to perform outbound communications to edge devices and to network communications devices at other sites over the power lines of the electrical system. Typically, PLC circuitry included in the electrical meter or other network communications device is the sole PLC-capable device in a residential household. As further described herein, the network communications device employs the PLC circuitry to continuously monitor and analyze, as a background process, one or more circuits in order to detect electrical arcing. The PLC circuitry detects electrical arcing conditions for the entire site from a single location via analysis of voltage measurements taken at the network communications device.

System Overview

Figure 1:
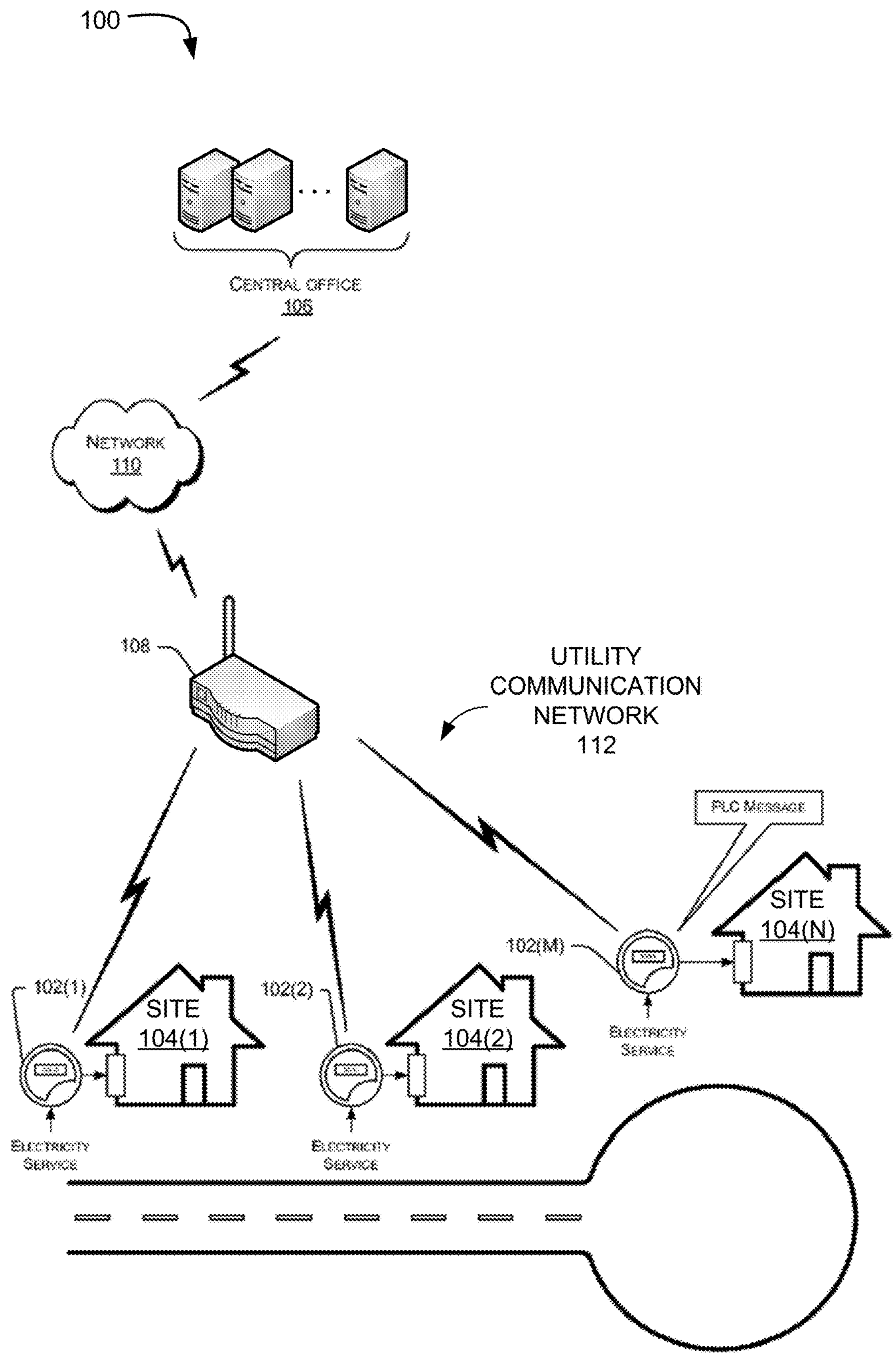
FIG. 1 illustrates a system configured to implement one or more aspects of the various embodiments.

FIG. 1 illustrates a system 100 configured to implement one or more aspects of the various embodiments. As shown, the system 100 includes a plurality of network communications devices 102(1), 102(2) . . . 102(M) a plurality of sites 104(1), 104(2) . . . 104(N), a central office 106, and an edge device 108. Central office 106 communicates with edge device 108 via a network 110. Network communications devices 102(1), 102(2) . . . 102(M) communication with the edge device 108 and with other network communications devices 102(1), 102(2) . . . 102(M) via PLC and/or radio frequency (RF) communications. Edge device 108 communicates with network communications devices 102(1), 102 (2) . . . 102(M) via a utility communication network 112. Each of the network 110 and the utility communication network 112 includes any technically feasible combination of a wide area network (WAN), metropolitan area network (MAN), local area network (LAN), neighborhood area network (NAN), personal area network (PAN), or the like.

The plurality of network communications devices 102(1), 102(2) . . . 102(M) (collectively referred to as network communications devices 102) is associated with a plurality of sites 104(1), 104(2) . . . 104(N) (collectively referred to as sites 104). M represents a number of network communications devices 102 in the utility communication network 112, where M is any integer greater than 0. N represents a number of individual sites 104 serviced by network communications devices 102 in the utility communication network 112, where N is any integer greater than 0. The number M of network communications devices 102 may or may not be equal to the number N of sites 104, because since some sites 104 may include multiple network communications devices 102. Additionally or alternatively, some network communications devices 102 may serve multiple sites 104. The network communications devices 102 communicate with one another via PLC and/or RF communications. PLC enables each of the network communications devices 102 to perform outbound communications over the power lines of the electrical system. As further described herein, each of the network communications devices 102 employs the PLC circuitry to continuously monitor and analyze, as a background process, one or more circuits in order to detect electrical arcing. The PLC circuitry detects electrical arcing conditions for the entire site from a single location via analysis of voltage measurements taken at the network communications device 102.

The network communications devices 102 are configured as, or in connection with, a variety of other computing devices including, without limitation, electricity meters, smart utility meters (e.g., electric, gas, and water meters), sensors (e.g., temperature sensors, weather stations, and frequency sensors, etc.), control devices, transformers, switches. The system 100 represents a heterogeneous network of network communications devices 102. In that regard, the system 100 includes any technically feasible combination of different types of network communications devices 102 (e.g., smart meters, cellular relays, sensors, etc.). Additionally or alternatively, the system 100 includes any technically feasible combination of different generations or models of network communications devices 102. Additionally or alternatively, the system 100 includes any technically feasible combination of network communications devices 102 that are capable of transmitting on different channels and using different modulation techniques, data rates, protocols, signal strengths, and/or power levels.

The network communications devices 102 are configured to communicate with a central office 106 via an edge device 108 that serves as a connection point to one or more backhaul networks 110, such as the Internet. The edge device 108 includes any one or more of a data collector, a cellular relay, a cellular router, an edge router, and a destination oriented directed acyclic graph (DODAG) root.

The utility communication network 112 is configurable as a "star network" in which the network communications devices 102 communicate directly with the edge device 108 (as shown). Additionally or alternatively, the utility communication network 112 is configurable as a "mesh network" in which the network communications devices 102 communicate with the edge device 108 either directly or via one or more intervening upstream devices (not shown). In this regard, the architecture of the system 100 of FIG. 1 is generically representative of either a star network or a mesh network.

Figure 2:
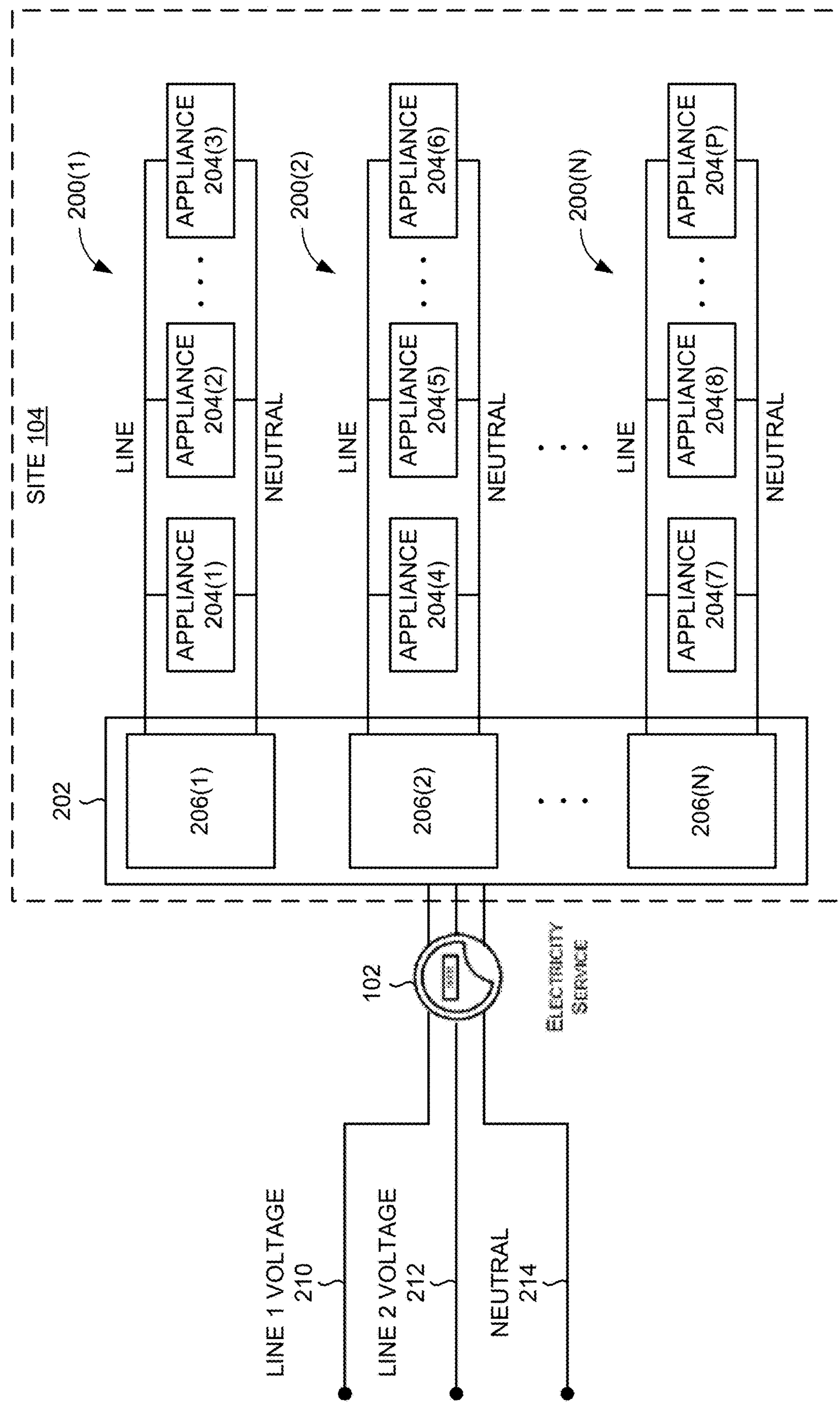
FIG. 2 illustrates a more detailed view of one of the sites of FIG. 1, according to various embodiments.

FIG. 2 illustrates a more detailed view of one of the sites 104 of FIG. 1, according to various embodiments. As shown, a network communications device 102 receives line 1 voltage 210, line 2 voltage 212, and neutral 214. Line 1 voltage 210, line 2 voltage 212, and neutral 214 may be any technically feasible voltage level. In some embodiments, the voltage difference between line 1 voltage 210 and line 2 voltage 212 may be in the range of 220 V to 240 V. In such embodiments, the difference between neutral and either line 1 voltage 210 or line 2 voltage 212 may be 110 V to 120 V. The network communications device 102 couples line 1 voltage 210, line 2 voltage 212, and neutral 214 to a circuit breaker panel 202. The circuit breaker panel 202 may include any technically feasible number of circuit breakers 206(1), 206(2) . . . 206(P), such as 10 circuit breakers, 20 circuit breakers, 50 circuit breakers, or more, depending on the size and complexity of the site 104. Each circuit breaker 206(1), 206(2) . . . 206(P) is coupled to a corresponding electrical circuit 200(1), 200(2) . . . 200(P). As shown, each electrical circuit 200(1), 200(2) . . . 200(P) is coupled with and supplies electricity to one or more appliances 204(1), 204(2) . . . 204(P). The appliances 204 are representative of any devices that are plugged in, directly wired in, or otherwise coupled to the electrical circuit 200. Appliances can include, without limitation, kitchen appliances, lamps, space heaters, and vacuum cleaners. Typically, the circuit breaker panel 202 and the electrical circuits 200(1), 200(2) . . . 200(P) also have a connection to safety ground, however, the safety ground connection is not shown in FIG. 2 for the sake of clarity. In some cases, some appliance may be connected between two lines rather than between a single line and ground, however, this is not shown in FIG. 2 for the sake of clarity.

As further described herein, the network communications device 102 includes communication technologies, such as power line communications (PLC). Via PLC, the network communications device 102 transmits messages to and receives messages from the edge device 108 and/or other network communications devices 102 connected to the edge device 108. As further described herein, the network communications device 102 employs the PLC communications circuitry to continuously monitor and analyze voltage measurements over time in order to detect electrical arcing for an entire site 104 from a single location. In parallel, the network communications device 102 deploys the PLC components to analyze voltage waveforms for electrical arcing detection. The network communications device 102 detects electrical arcing conditions between line 1 voltage 210 and line 2 voltage 212. Additionally or alternatively, the network communications device 102 detects electrical arcing conditions between neutral and either line 1 voltage 210 or line 2 voltage 212.

Detecting Electrical Arcing in an Electrical System

Figure 3:
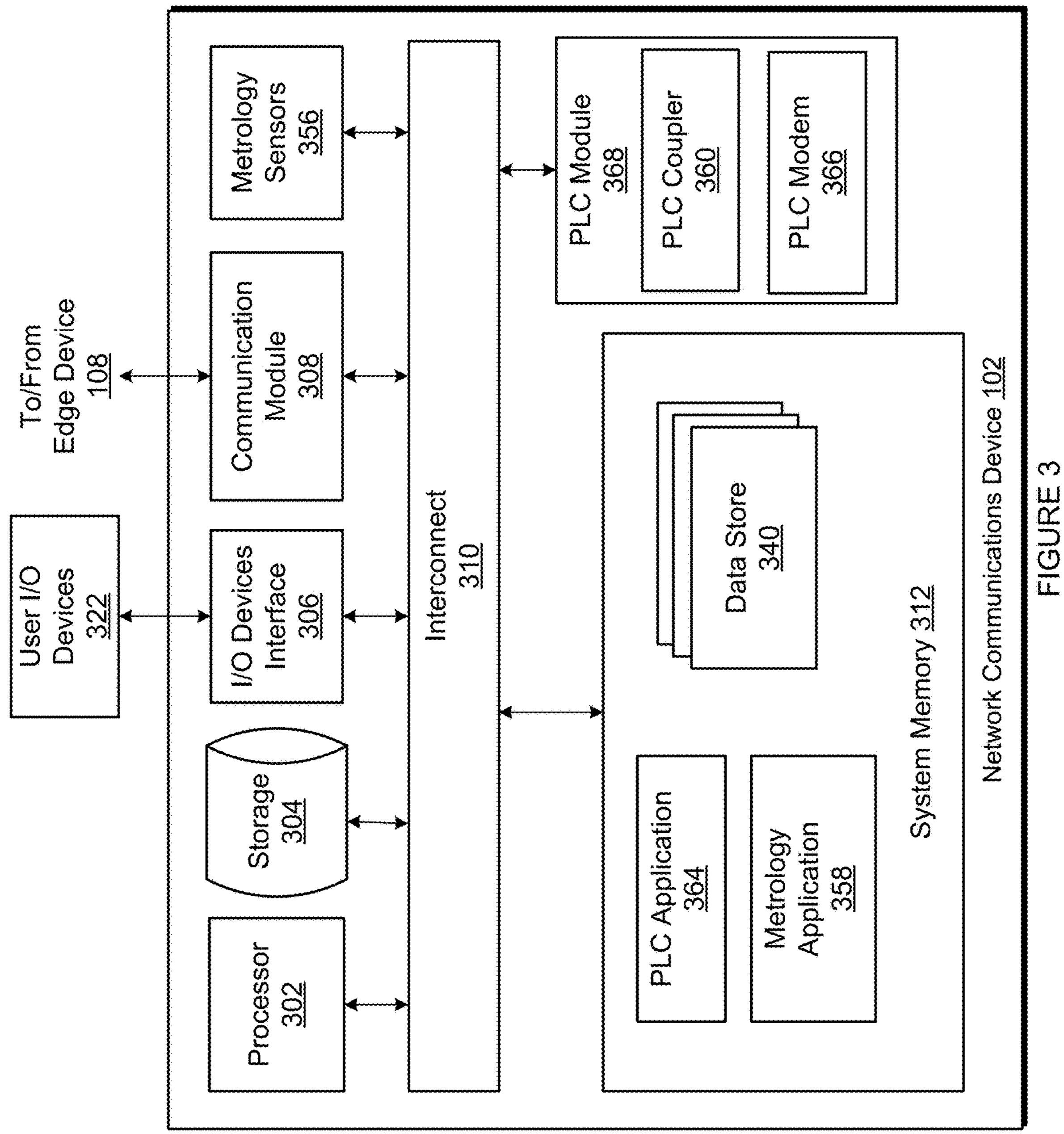
FIG. 3 illustrates a more detailed view of the network communications device of FIG. 1, according to various embodiments.

FIG. 3 illustrates a more detailed view of the network communications device of 102 FIG. 1, according to various embodiments. As shown, the network communications device 102 includes, without limitation, a processor 302, storage 304, an input/output (I/O) device interface 306, a communications module 308, an interconnect 310, and a system memory 312. The network communications device 102 further includes, without limitation, metrology sensors 356 and a PLC module 368.

In general, processor 302 retrieves and executes programming instructions stored in system memory 312. Typically, processor 302 includes one or more digital signal processor (DSPs). More generally, processor 302 may be any technically feasible form of processing device configured to process data and execute program code. Processor 302 could be, for example, a central processing unit (CPU), a digital signal processor (DSP), a graphics processing unit (GPU), an application-specific integrated circuit (ASIC), a field-programmable gate array (FPGA), and so forth. Processor 302 stores and retrieves application data residing in the system memory 312. Processor 302 is included to be representative of a single processor, multiple processors, a single processor having multiple processing cores, and the like. In operation, processor 302 is the master processor of network communications device 102, controlling and coordinating operations of other system components. System memory 312 stores software applications and data for use by processor 302. Processor 302 executes software applications, also referred to herein as software application programs, stored within system memory 312 and optionally an operating system. In particular, processor 302 executes software and then performs one or more of the functions and operations set forth in the present application.

The storage 304 may be a disk drive storage device. Although shown as a single unit, the storage 304 may be a combination of fixed and/or removable storage devices, such as fixed disc drives, floppy disc drives, tape drives, removable memory cards, or optical storage, network attached storage (NAS), or a storage area-network (SAN). In some embodiments, the network communications device 102 may not include storage 304. In such embodiments, processor 302 stores data in and retrieve data from dynamic random access memory (DRAM), flash memory, and the like. Processor 302 communicates to other computing devices and systems via communications module 308. The communications module 308 is configured to transmit and receive data via a communications network, such as network 110, via the edge device 108 and/or one or more other network communications devices 102.

The communication module 308 may include hardware and/or software components to enable one or multiple different modes of communication. Software components included in the communications module 308 may include, without limitation, a software defined radio, drivers, libraries, applications, and plugins. These software components are stored in system memory 312 and executable or accessible by the processor 302. Additionally, in some embodiments, the communication module 308 may include one or more of dedicated processors and/or memory.

In some embodiments, the communication module 308 may include an RF transceiver configured to transmit and/or receive RF signals via one or more channels or frequencies. The transceiver may include an RF front end and a baseband processor or a software defined radio. In some implementations, each of the network communications devices 102 includes a single radio configured to send and receive data on multiple different channels, such as a control channel and multiple data channels of each communication link. The RF transceiver may also be configured to implement a plurality of different modulation techniques, data rates, protocols, signal strengths, and/or power levels. Additionally or alternatively, the communication module 308 includes a cellular or wide area network (WAN) module, or other communication software and/or hardware to facilitate communication with other devices in the utility communication network 112.

The interconnect 310 facilitates transmission, such as of programming instructions and application data, between the processor 302, input/output (I/O) devices interface 306, storage 304, communications module 308, system memory 312, metrology sensors 356, and PLC module 368. The I/O devices interface 306 is configured to receive input data from user I/O devices 322. Examples of user I/O devices 322 may include one of more buttons, a keyboard, and a mouse or other pointing device. The I/O devices interface 306 may also include an audio output unit configured to generate an electrical audio output signal, and user I/O devices 322 may further include a speaker configured to generate an acoustic output in response to the electrical audio output signal. Another example of a user I/O device 322 is a display device that generally represents any technically feasible means for generating an image for display. For example, the display device may be a liquid crystal display (LCD) display, CRT display, or DLP display. The display device may be a TV that includes a broadcast or cable tuner for receiving digital or analog television signals.

The system memory 312 includes, without limitation, a metrology application 358, a PLC application 364, and a data store 340. In operation, processor 302 executes the metrology application 358 and the PLC application 364 to perform one or more of the techniques disclosed herein. Data store 340 may include various data structures retrieved by and/or stored by the metrology application 358 and the PLC application 364.

In operation, the metrology application 358 executing on the network communications device 102, and in conjunction with metrology sensors 356, senses and measures electricity consumption at the site 104. The metrology sensors 356 are representative of any of a variety of hardware and/or software usable to sense and measure electricity consumption data of the site 104.

In operation, the PLC application 364 executing on the network communications device 102, and in conjunction with the PLC module 368, enables the network communications device 102 to communicate via PLC. In this regard, the PLC application 364 and the PLC module 368 form a PLC transceiver. The PLC application 364 and the PLC module 368 are configured for communication with other network communications devices 102 and/or the edge device 108 in the utility communication network 112. At any given time, the PLC application 364 and PLC module 368 are in one of three states: (1) transmitting PLC message packets; (2) receiving and decoding PLC message packets; and (3) waiting for PLC message packets. The PLC application 364 and PLC module 368 spend the largest percentage of time in the third state, waiting for PLC message packets. During this state, the PLC application 364 and PLC module 368 are able to analyze circuits at the site 104 in order to detect electrical arcing in parallel with waiting for PLC message packets. The PLC application 364 and PLC module 368 detect electrical arcing conditions for the entire site from a single location via analysis of voltage measurements taken at the network communications device 102.

The PLC module 368 includes a PLC coupler 360 to connect the PLC module 368 to the electricity lines for communication. The PLC application 364, when executing, interprets communications received by a PLC modem 366 and transmits outgoing communications via the PLC modem 366. The PLC modem 366 acts at the direction of the PLC application 364 to transmit and receive PLC communications over the circuit internal to the site 104. In some embodiments, the PLC modem 366 transmits and receives PLC communications over low, medium, and/or high-voltage power lines of the utility distribution network.

Messages transmitted via PLC include any technically feasible information, including, without limitation, a request to disconnect electricity service to the site, an alert of a potentially unsafe condition at the site, or a status notification. Based on the message, the network communications device 102 performs some action, such as connecting electricity service to the site 104 or relaying the alert.

The PLC application 364 engages the PLC module 368 to continuously monitor and analyze circuits at the site 104 in order to detect electrical arcing. The PLC application 364 performs this analysis over multiple power cycles. The PLC application 364 acquires voltage waveform data and performs electrical arcing detection over multiple power cycles. The duration for each power cycle is 20 ms for 50 Hz power systems and 16.67 ms for 60 Hz systems. Based on these durations, the PLC application 364 performs electrical arcing detection over a period of 80-120 ms for 50 Hz power systems. Similarly, the PLC application 364 performs electrical arcing detection over a period of 66.67-100 ms for 60 Hz power systems.

More specifically, the PLC application 364 analyzes circuits at the site 104 via the PLC modem 366 in the PLC module 368. When in communications mode, the PLC modem 366 is performing analog-to-digital conversion (ADC) and demodulating signal data present on the power line, and analyzing this signal data for an expected preamble which signifies the beginning of a message. In electrical arc detection mode, the PLC application 364 and the PLC modem 366 utilize the same ADC to acquire voltage waveform data. The PLC application 364 and the PLC modem 366 detect abnormal spectral pattern on the voltage waveform data. The PLC application 364 analyzes the mains voltage waveform data for anomalies and specific noise patterns, which indicate a possible electrical arcing condition.

PLC communications typically involve modulation energy in the 1 kHz to 1 MHz range. In some embodiments, the PLC communications system operates in the 100 kHz to 500 kHz range. Consequently, when the PLC application 364 is performing electrical arcing detection, the PLC application 364 is able to detect electrical arcing that exhibits signal energy in the 1 kHz to 1 MHz range or, alternatively, in the 100 kHz to 500 kHz range. As further discussed herein, this range is consistent with the frequency range exhibited by typical electrical arcing conditions. In addition, the sensitivity of the receiver in the PLC module 368 is in the range of 20-50 uV, which is sufficient for sensing even weak remote electrical arcing events.

During the analysis, the PLC application 364 records the voltage waveform data during the power cycles currently being analyzed. The PLC application 364 correlates and compares these voltage waveform data over an extended period of time to look for trends indicating that an electrical arcing condition is developing in one or more circuits. Depending on the amount of available system memory 312, the PLC application 364 analyzes voltage waveform data over a period of weeks, months, or even years. Such long term analysis enables the PLC application 364 to detect long term growth and development of electrical arcing conditions on all circuits at the site 104.

In some embodiments, certain loads, such as space heaters, refrigerators, washing machines and dryers, electric ranges, air conditioning units, and computers all have unique and distinct load patterns that may be referred to as signatures. The PLC application 364 may correlate the amount of current drawn, the change in current draw over time, the time of day, and other data in order to generate these signatures. In this manner, the PLC application 364 may identify which loads are operating at any given time. The PLC application 364 may correlate this information with data resulting from electrical arcing analysis in order to identify which load(s) may be associated with an electrical arcing condition.

Upon detecting an electrical arcing condition on an electrical circuit, the PLC application 364 performs one or more remedial operations. In one example, the PLC application 364 could disconnect the electrical circuits within the site 104 from the electrical utility via a service disconnect (not shown), thereby disconnecting power from the site 104. In another example, the PLC application 364 could transmit data regarding the electrical arc via an edge device 108 to the central office 106 for analysis. The data could include a sample of the voltage waveform data and/or other relevant data. In yet another example, the PLC application 364 could transmit a message to the central office 106 via an edge device 108. The message could include an alert to notify the central office 106 that the electrical arcing condition has been detected. The central office 106 could subsequently transmit a request for further information to the PLC application 364 via the network communications device 102. In response, the PLC application 364 could transmit additional data regarding the electrical arcing condition, such as a sample of the voltage waveform data, to the central office 106 for analysis. In yet another example, the PLC application 364 could transmit such data and/or an alert to other nearby network communications devices 102.

As described herein, the PLC application 364 in conjunction with the PLC modem 366 senses voltage but typically does not sense current. However, in some embodiments, the PLC application 364 may receive current waveform data in addition to the voltage waveform data received via the PLC modem 366. In one particular example, the PLC application 364 could receive current waveform data from the metrology application 358 and/or metrology sensors 356.

Figure 4:
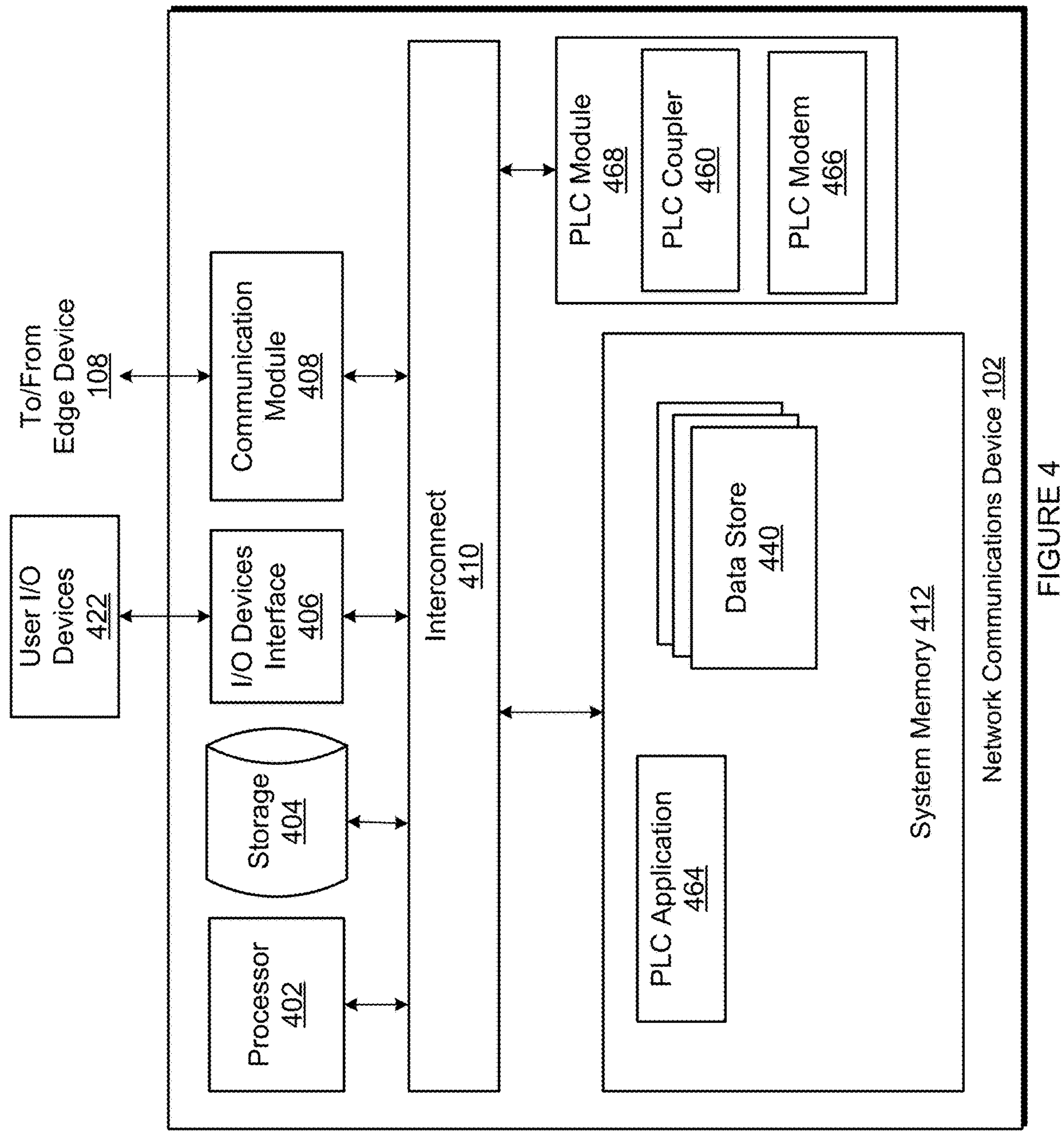
FIG. 4 illustrates a more detailed view of the network communications device of FIG. 1, according to various other embodiments.

FIG. 4 illustrates a more detailed view of the network communications device 102 of FIG. 1, according to various other embodiments. As shown, the network communications device 102 includes, without limitation, a processor 402, storage 404, an input/output (I/O) device interface 406, a communications module 408, an interconnect 410, and a system memory 412. The network communications device 102 further includes, without limitation, a PLC module 468. The processor 402, storage 404, input/output (I/O) device interface 406, communications module 408, interconnect 410, system memory 412, and PLC module 468 function substantially the same as corresponding elements of the network communications device 102 of FIG. 3, except as further described below.

The network communications devices 102 of FIG. 3 and FIG. 4 are substantially the same, except that the network communications devices 102 of FIG. 4 does not include a metrology application 358 or metrology sensors 356. Consequently, the network communications devices 102 of FIG. 4 is deployable in an electric meter that does not have PLC communications capability. Additionally or alternatively, the network communications devices 102 of FIG. 4 is deployable for installation or integration into any technically feasible device, including, without limitation, street light controllers, solar panel controllers, and power inverters. Additionally or alternatively, the network communications devices 102 of FIG. 4 are deployable in a standalone manner without an additional device. In any of these configurations, the network communications devices 102 are capable of performing any of the PLC communications and electrical arcing detection techniques disclosed herein.

In general, processor 402 retrieves and executes programming instructions stored in system memory 412. Processor 402 may be any technically feasible form of processing device configured to process data and execute program code. Processor 402 could be, for example, a central processing unit (CPU), a digital signal processor (DSP), a graphics processing unit (GPU), an application-specific integrated circuit (ASIC), a field-programmable gate array (FPGA), and so forth. Processor 402 stores and retrieves application data residing in the system memory 412. Processor 402 is included to be representative of a single processor, multiple processors, a single processor having multiple processing cores, and the like. In operation, processor 402 is the master processor of network communications device 102, controlling and coordinating operations of other system components. System memory 412 stores software applications and data for use by processor 402. Processor 402 executes software applications, also referred to herein as software application programs, stored within system memory 412 and optionally an operating system. In particular, processor 402 executes software and then performs one or more of the functions and operations set forth in the present application.

The storage 404 may be a disk drive storage device. Although shown as a single unit, the storage 404 may be a combination of fixed and/or removable storage devices, such as fixed disc drives, floppy disc drives, tape drives, removable memory cards, or optical storage, network attached storage (NAS), or a storage area-network (SAN). Processor 402 communicates to other computing devices and systems via communications module 408. The communications module 408 is configured to transmit and receive data via a communications network, such as network 110, via the edge device 108 and/or one or more other network communications devices 102.

The communication module 408 may include hardware and/or software components to enable one or multiple different modes of communication. Software components included in the communications module 408 may include, without limitation, a software defined radio, drivers, libraries, applications, and plugins. As noted above, these software components are stored in system memory 412 and executable or accessible by the processor 402. Additionally, in some embodiments, the communication module 408 may include one or more of dedicated processors and/or memory.

In some embodiments, the communication module 408 may include an RF transceiver configured to transmit and/or receive RF signals via one or more channels or frequencies. The RF transceiver may include an RF front end and a baseband processor or a software defined radio. In some implementations, each of the network communications devices 102 includes a single radio configured to send and receive data on multiple different channels, such as a control channel and multiple data channels of each communication link. The transceiver may also be configured to implement a plurality of different modulation techniques, data rates, protocols, signal strengths, and/or power levels. Additionally or alternatively, the communication module 408 includes a cellular or wide area network (WAN) module, or other communication software and/or hardware to facilitate communication with other devices in the utility communication network 112.

The interconnect 410 facilitates transmission, such as of programming instructions and application data, between the processor 402, input/output (I/O) devices interface 406, storage 404, communications module 408, system memory 412, and PLC module 468. The I/O devices interface 406 is configured to receive input data from user I/O devices 422. Examples of user I/O devices 422 may include one of more buttons, a keyboard, and a mouse or other pointing device. The I/O devices interface 406 may also include an audio output unit configured to generate an electrical audio output signal, and user I/O devices 422 may further include a speaker configured to generate an acoustic output in response to the electrical audio output signal. Another example of a user I/O device 422 is a display device that generally represents any technically feasible means for generating an image for display. For example, the display device may be a liquid crystal display (LCD) display, CRT display, or DLP display. The display device may be a TV that includes a broadcast or cable tuner for receiving digital or analog television signals.

The system memory 412 includes, without limitation, a PLC application 464, and a data store 440. In operation, processor 402 executes the PLC application 464 to perform one or more of the techniques disclosed herein. Data store 440 may include various data structures retrieved by and/or stored by the PLC application 464.

In operation, the PLC application 464 executing on the network communications device 102, and in conjunction with the PLC module 468, enables network communications device 102 to communicate via PLC. In this regard, the PLC application 464 and the PLC module 468 form a PLC transceiver. The PLC application 464 and the PLC module 468 are configured for communication with other network communications device 102 and/or edge device 108 in the utility communication network. 112. At any given time, the PLC application 464 and PLC module 468 are in one of three states: (1) transmitting PLC message packets; (2) receiving and decoding PLC message packets; and (3) waiting for PLC message packets. The PLC application 464 and PLC module 468 spend the largest percentage of time in the third state, waiting for PLC message packets. During this state, the PLC application 464 and PLC module 468 are able to analyze circuits at the site 104 in order to detect electrical arcing in parallel with waiting for PLC message packets. The PLC application 464 and PLC module 468 detect electrical arcing conditions for the entire site from a single location via analysis of voltage measurements taken at the network communications device 102.

The PLC module 468 includes a PLC coupler 460 to connect the PLC module 468 to the electricity lines for communication. The PLC application 464, when executing, interprets communications received by a PLC modem 466 and transmits outgoing communications via the PLC modem 466. The PLC modem 466 acts at the direction of the PLC application 464 to transmit and receive PLC communications over the circuit internal to the site 104. In some embodiments, the PLC modem 466 may transmit and receive PLC communications over low, medium, and/or high-voltage power lines of the utility distribution network.

Messages transmitted via PLC include any technically feasible information, including, without limitation, a request to disconnect electricity service to the site, an alert of a potentially unsafe condition at the site, or a status notification. Based on the message, the network communications device 102 performs some action, such as connecting electricity service to the site 104 or relaying the alert.

As further described herein in conjunction with FIG. 3, the PLC application 464 engages the PLC module 468 to continuously monitor and analyze circuits at the site 104 in order to detect electrical arcing. The PLC application 464 and PLC module 468 detect electrical arcing conditions for the entire site from a single location via analysis of voltage measurements taken at the network communications device 102.

Figure 5A:
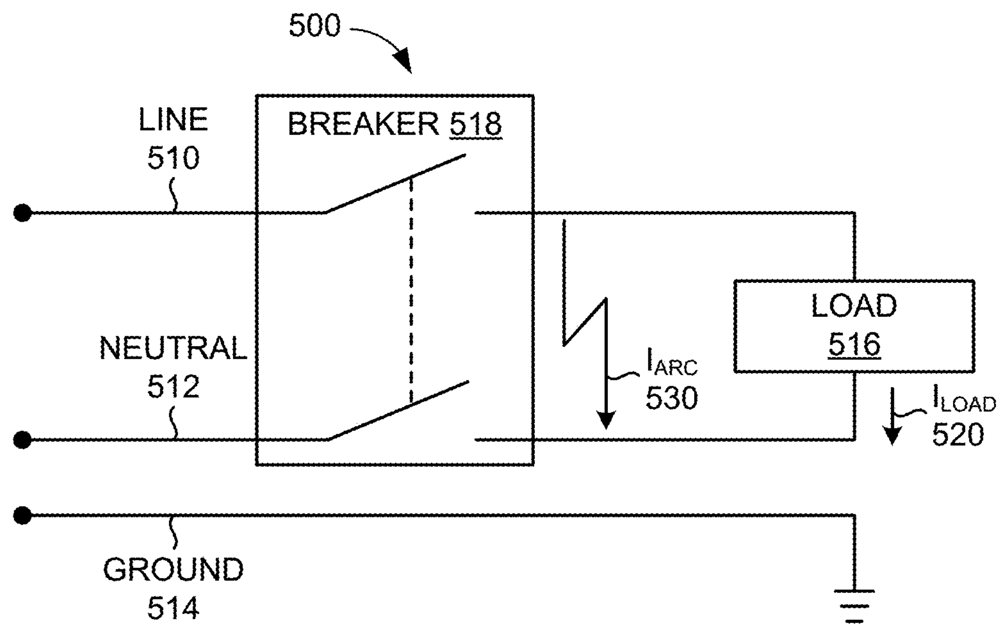
FIGS. 5A-5C illustrate various types of electrical arcing conditions that can occur in the circuit of FIG. 2, according to various embodiments.
Figure 5B:
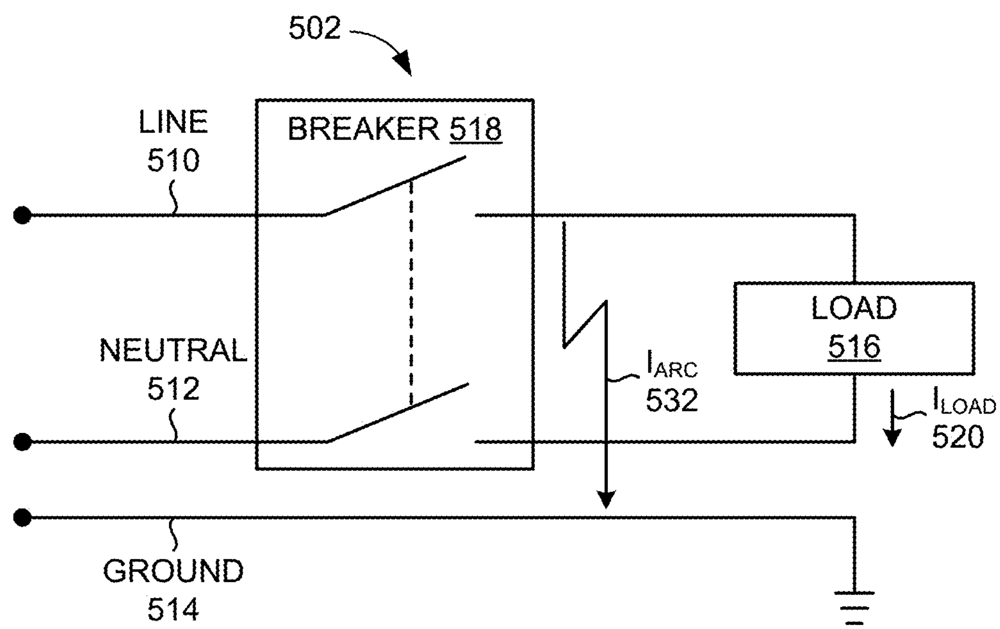
Figure 5C:
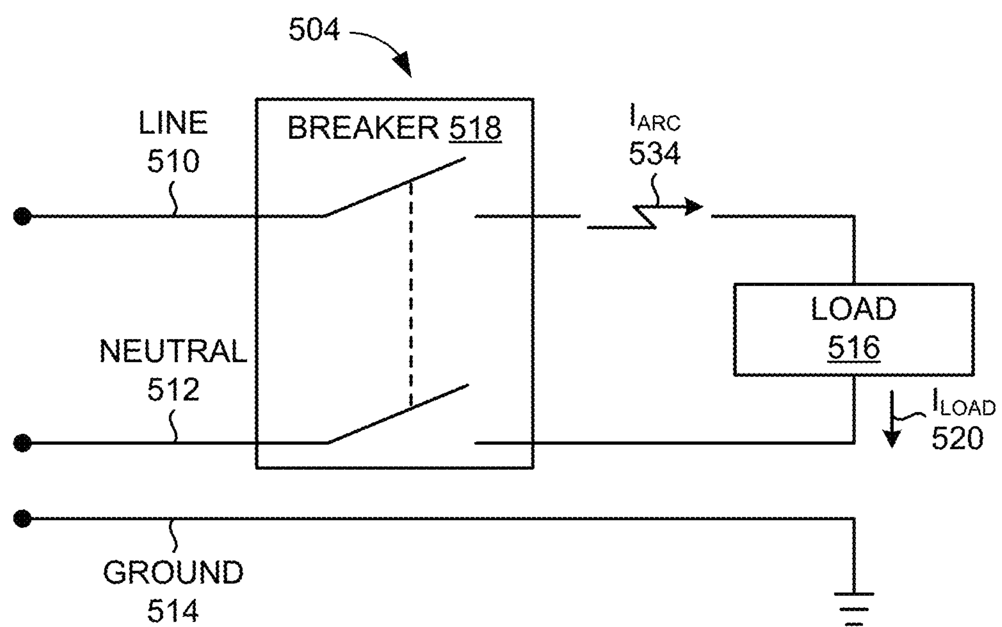

FIGS. 5A-5C illustrate various types of electrical arcing conditions that can occur in the electrical circuit 200 of FIG. 2, according to various embodiments. As shown in FIG. 5A, a load 516 is connected to line 510 and neutral 512 via a breaker 518. In addition, the load 516 is associated with a safety ground 514 connection. A load current $I_{LOAD}$ 520 passes through the load 516 between line 510 and neutral 512. In the illustrated type of electrical arcing condition, a short or other fault condition causes an arc current $I_{ARC}$ 530 to pass from line 510 to neutral 512, in parallel with the load 516. This type of electrical arcing condition is referred to herein as a parallel fault.

As shown in FIG. 5B, a load 516 is connected to line 510 and neutral 512 via a breaker 518. In addition, the load 516 is associated with a safety ground 514 connection. A load current $I_{LOAD}$ 520 passes through the load 516 between line 510 and neutral 512. In the illustrated type of electrical arcing condition, a short or other fault condition causes an arc current $I_{ARC}$ 532 to pass from line 510 to safety ground 514. This type of electrical arcing condition is referred to herein as a ground fault.

As shown in FIG. 5C, a load 516 is connected to line 510 and neutral 512 via a breaker 518. In addition, the load 516 is associated with a safety ground 514 connection. A load current $I_{LOAD}$ 520 passes through the load 516 between line 510 and neutral 512. In the illustrated type of electrical arcing condition, a short or other fault condition causes an arc current $I_{ARC}$ 534 to pass in series with line 510 and the load 516. This type of electrical arcing condition is referred to herein as a series fault. Series faults are typically more difficult to detect and analyze relative to parallel faults and ground faults. Further, series faults often develop over long periods of time as wiring connections between wiring, outlets, and appliances deteriorate over time. Via the disclosed techniques, the PLC application, executing on a network communications device 102 effectively detects and analyzes such series faults.

Figure 6A:
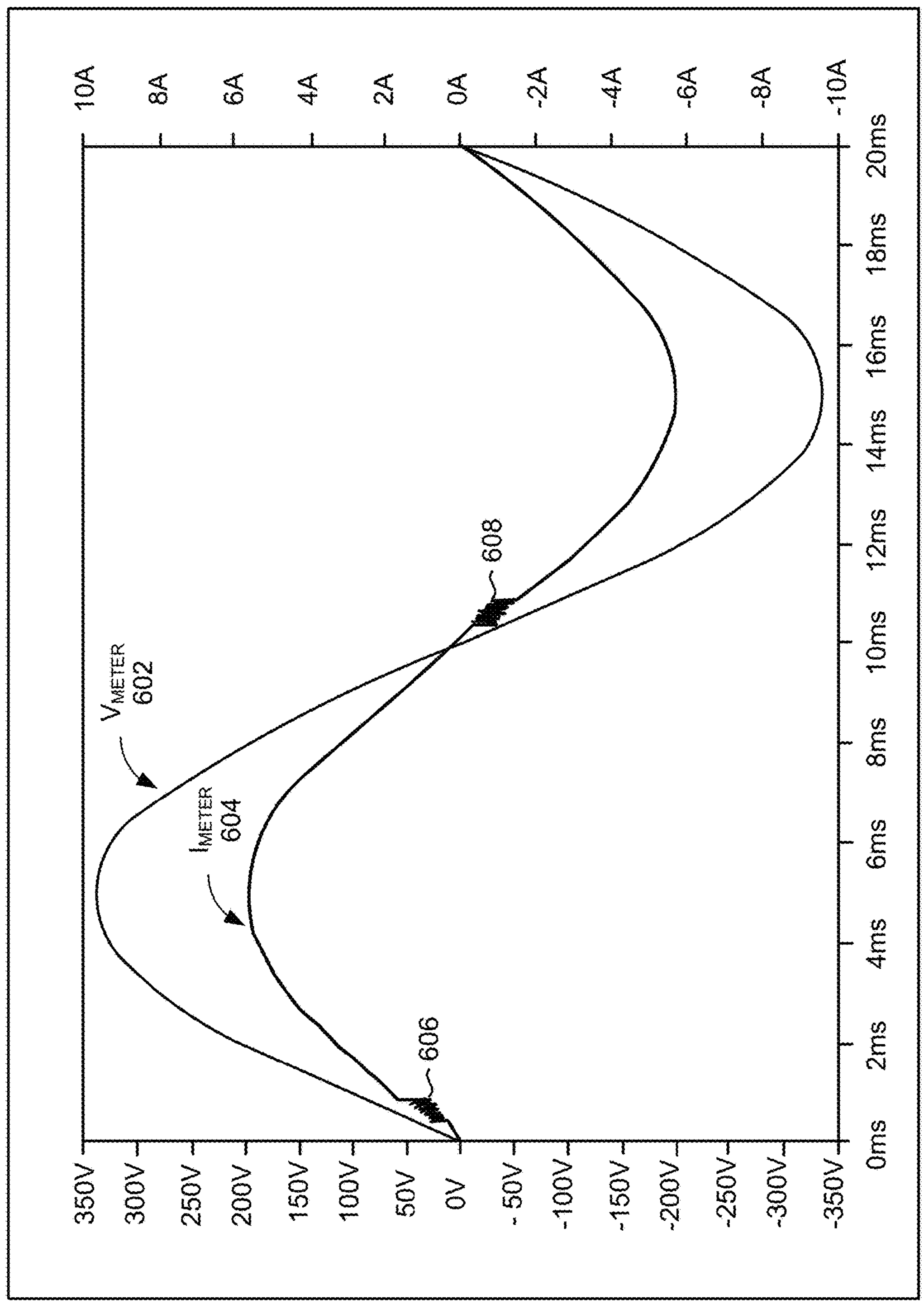
FIGS. 6A-6D illustrate waveforms characteristic of the electrical arcing conditions that can occur in one of the electrical circuits of FIG. 2, according to various embodiments.

FIGS. 6A-6D illustrate waveforms characteristic of the electrical arcing conditions that can occur in one of the electrical circuits 200 of FIG. 2, according to various embodiments. As shown in FIG. 6A, $V_{meter}$ 602 is a waveform of the voltage at the meter versus time over a period of approximately one cycle at 50 Hz, or 20 ms. $I_{meter}$ 604 is a waveform of the current at the meter versus time over a period of approximately one cycle. During an electrical arcing condition, no current flows into the load through the degraded connection when the line voltage is low. When the voltage exceeds a threshold level of several volts to several tens of volts, a series of short discharge events occurs, which is indicative of an electrical arcing condition. The electrical arcing condition is visible in the $I_{meter}$ 604 waveform at point 606 and point 608, corresponding to when the $V_{meter}$ 602 waveform sometime after a zero-crossing, when $V_{meter}$ 602 is rising above the 0.0 V level or falling below the 0.0 V level. At point 606 and point 608, the $I_{meter}$ 604 waveform exhibits high-frequency current changes. The magnitude of the arc current visible at point 606 and point 608 is determined by the load. As shown, these current transients during electrical arcing are highly visible.

Similarly, the $V_{meter}$ 602 waveform exhibits high-frequency voltage changes. However, the high-frequency changes in the $V_{meter}$ 609 waveform are in the range of 10-150 mV, which is small in comparison the absolute voltage of the $V_{meter}$ 602 waveform. The magnitude of the arc voltage is determined by the high-frequency impedance of the mains voltage. The voltage transients during electrical arcing are not readily visible due to the relative magnitude of the voltage transients relative to the magnitude of the fundament voltage waveform, which may be in the range of 120 V to 240 V or more at 50 Hz or 60 Hz.

Figure 6B:
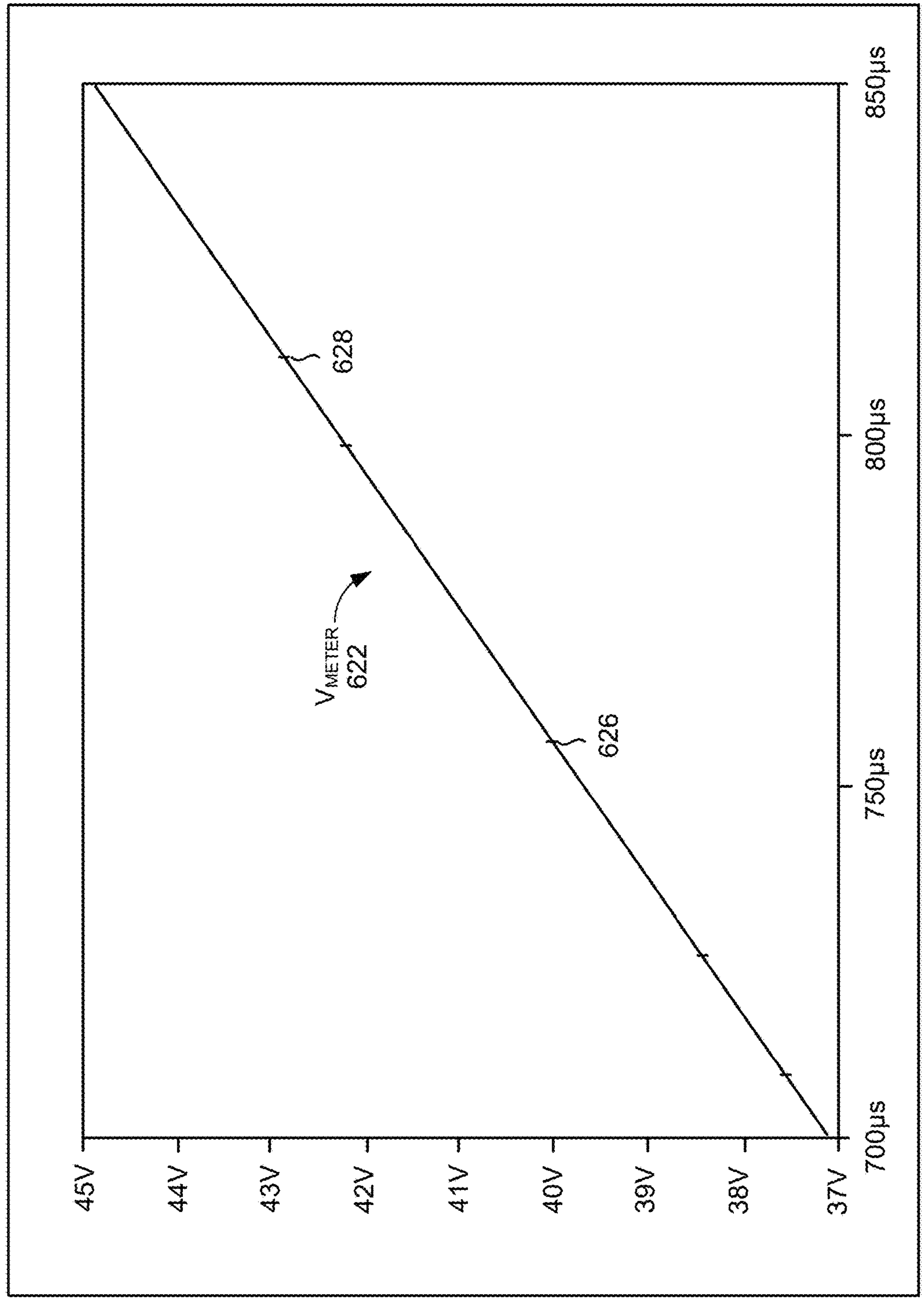

As shown in FIG. 6B, an expanded portion of the meter voltage is shown in the $V_{meter}$ 622 waveform from 700 uS to 850 us, as $V_{meter}$ 622 rises from about 37 V to 45 V. Although electrical arcing conditions is visible as high-frequency voltage changes, such as at point 626 and point 628, the magnitude of the high-frequency voltage changes is small relative to the absolute voltage of the $V_{meter}$ 622 waveform.

Figure 6C:
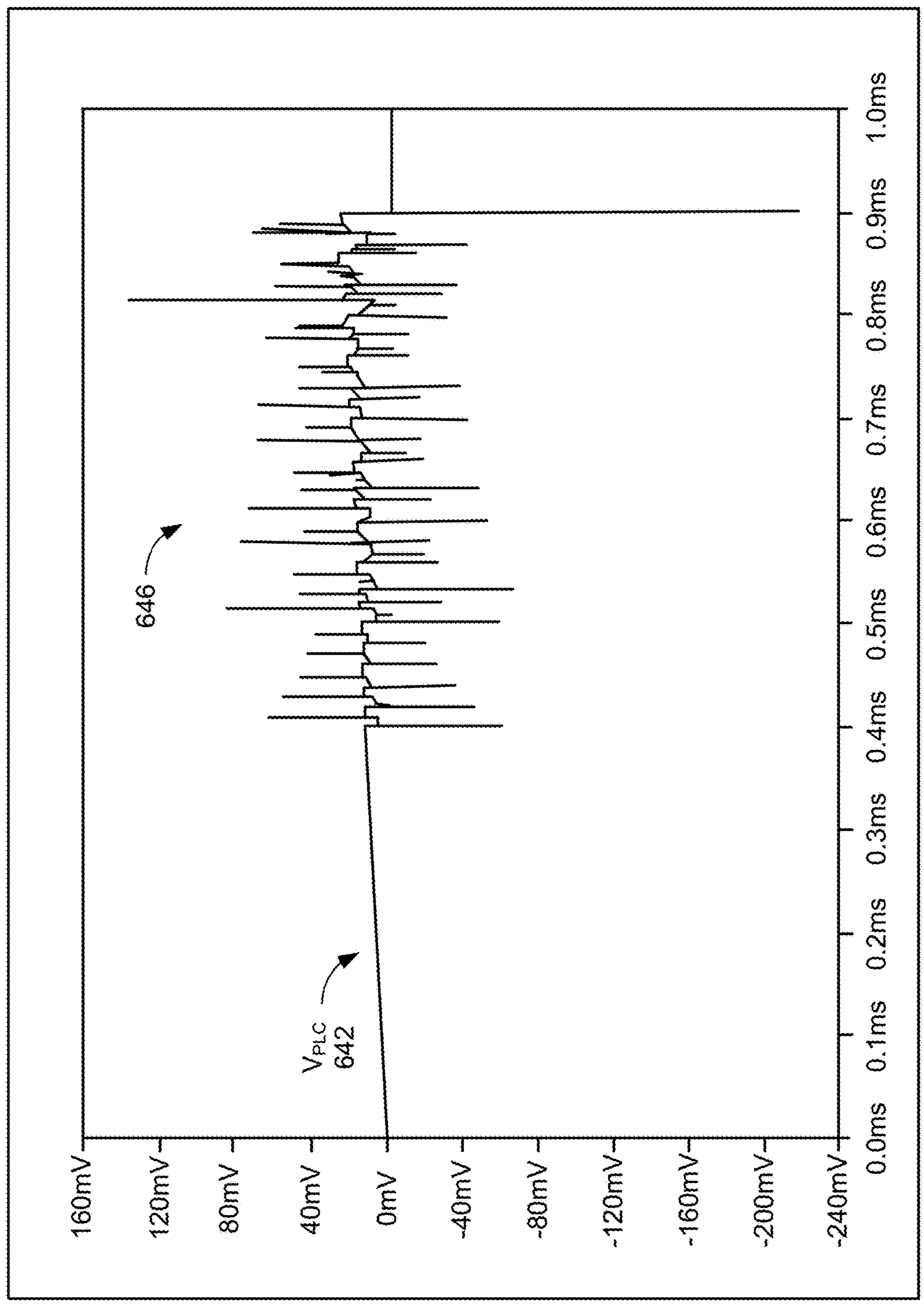

In order to detect the transient voltage due to electrical arcing, $V_{meter}$ 602 is passed through a PLC coupler that includes a high-pass filter. The PLC coupler removes the fundamental voltage waveform in order render the PLC message data more visible. In a similar manner, the PLC coupler removes the fundamental voltage waveform and renders the electrical arcing voltage transients more visible. As shown in FIG. 6C, the $V_{pic}$ 642 waveform represents the $V_{meter}$ 602 waveform after $V_{meter}$ 602 has been processed by the high-pass filter included in the PLC coupler. As a result, the voltage transients due to electrical arcing are more visible, as shown by region 646.

Figure 6D:
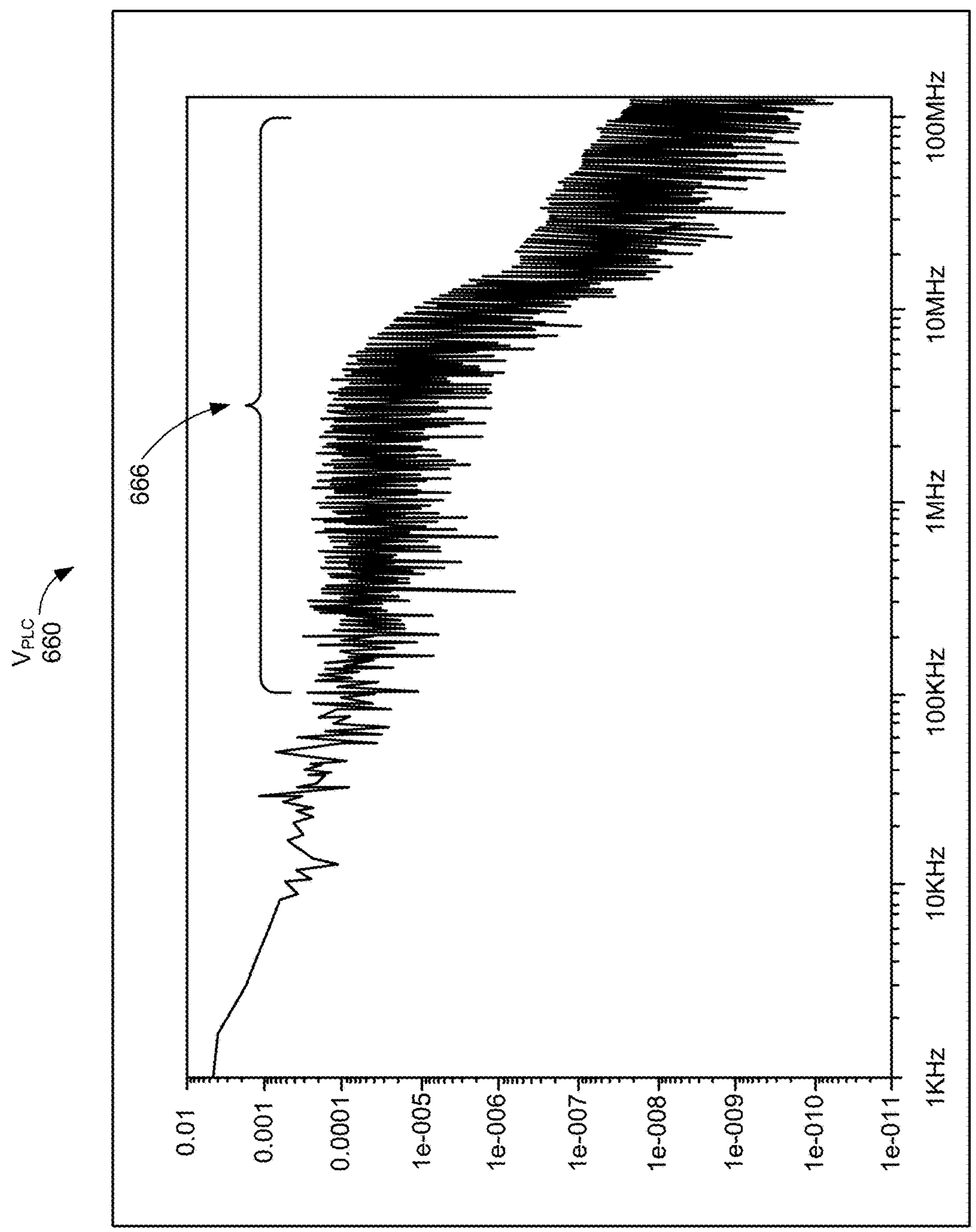

As shown in FIG. 6D, $V_{pic}$ 660 voltage spectrum illustrates voltage versus frequency from approximately 1 kHz to 100 MHz. The $V_{pic}$ 660 voltage spectrum may be generated by performing a fast Fourier transform (FFT) on an interval of samples of the $V_{pic}$ 642 voltage waveform. In one example, the $V_{pic}$ 642 voltage waveform could include 2 million samples per second, if the FFT transforms the voltage samples over a period of 1 ms, then the FFT transforms a set of 2000 voltage samples. The FFT continuously samples and transforms at 1 ms intervals into frequency spectra. The frequency spectra are analyzed for bursts of voltage transients, indicating a potential electrical arcing condition.

Again, the voltage transients due to electrical arcing are more visible, as shown by region 666. The PLC application, executing on a network communications device 102 determines that an electrical circuit with the behavior shown in $V_{pic}$ 660 voltage spectrum, and where bursts of voltage transients are synchronized with a zero-crossing, has degraded over time and that a possible electrical arcing condition has developed.

Figure 7:
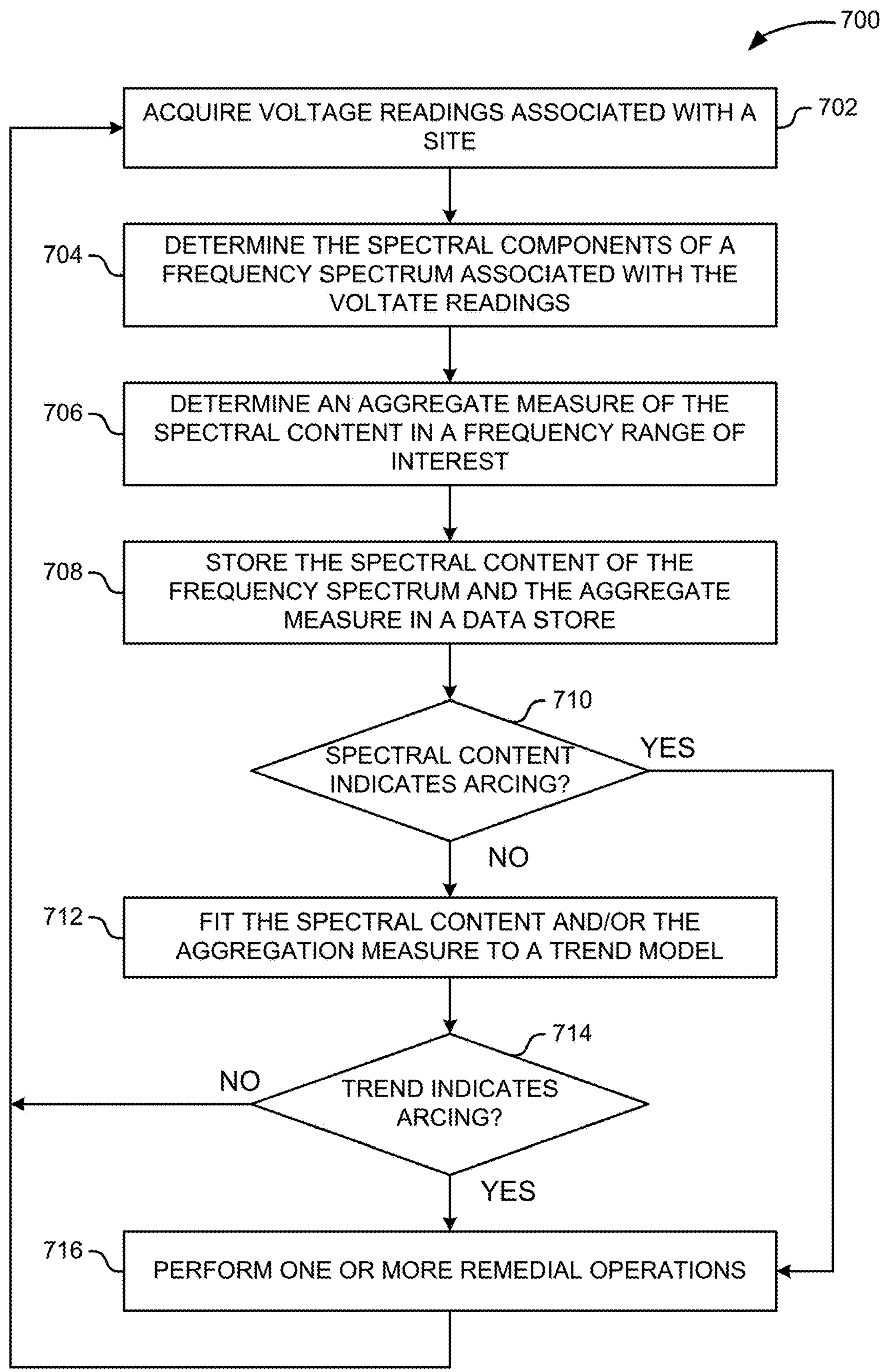
FIG. 7 is a flow diagram of method steps for detecting electrical arcing in an electrical system, according to various embodiments.

FIG. 7 is a flow diagram of method steps for detecting electrical arcing in an electrical system, according to various embodiments. Although the method steps are described in conjunction with the systems of FIGS. 1-6D, persons skilled in the art will understand that any system configured to perform the method steps in any order falls within the scope of the present invention.

The method 700 begins at step 702, where a PLC application executing on a network communications device 102 acquires voltage readings constituting waveform data associated with a site 104. The PLC application detects line-to-line voltage readings between a first line voltage signal and a second line voltage signal. Additionally or alternatively, the PLC application detects readings between a neutral signal and either of the line voltage signals. The PLC application obtains the voltage readings via power line communications components included in the network communications device 102. These power line communications components include, without limitation, a PLC module that further includes a PLC coupler and a PLC modem. The PLC coupler connects the PLC modem to the line and/or neutral signals for communication. The voltage readings at the network communications device 102 are exemplified by FIGS. 6A-6B. In order to facilitate analysis of the electrical arcing signal, the PLC module voltage signal performs an analog-to-digital conversion to convert the analog voltage signal into digital samples.

The PLC module applies a high-pass filter to either the analog voltage signal or to the digital samples to remove the fundamental voltage frequency, typically 50 Hz or 60 Hz. After applying the high-pass filter, only the electrical arcing signals and possibly some PLC communications signals remain, thereby further facilitating analysis of the electrical arcing signal. The voltage readings at the network communications device 102 after removing the fundamental voltage frequency are exemplified by FIG. 6C.

At step 704, the PLC application determines spectral content of a frequency spectrum associated with the voltage readings. The PLC may generate the frequency spectrum via any technically feasible mechanism, including, without limitation, fast Fourier transform (FFT) and discrete Fourier transform (DFT). The spectral content of the frequency spectrum is exemplified by FIG. 6D.

At step 706, the PLC application optionally determines an aggregate measure of the spectral content of the frequency spectrum in a frequency range of interest. In general, the frequency range of interest is an operational frequency range of the PLC module and is consistent with a frequency range over which electrical arcing is detectable. In one example, the frequency range of interest could be 1 kHz to 1 MHz. In another example, the frequency range of interest could be 100 kHz to 500 kHz. The aggregated measure could be any technically feasible measure indicative of an electrical arcing condition, including, without limitation, a weighted sum of the spectral content and the area under the curve of the range of interest. At step 708, the PLC application stores the spectral content of the frequency spectrum and the aggregate measure resulting from the aggregation computation in a data store, such as data store 340 and/or data store 440.

At step 710, the PLC application determines whether the spectral content is indicative of an electrical arcing condition. In making this determination, the PLC application may use any technically feasible approach. In one example, the PLC application could determine that the spectral content is indicative of an electrical arcing condition if any one or more components of the frequency spectrum exceed a predetermined and/or configurable threshold level. In another example, the PLC application could determine that the spectral content is indicative of an electrical arcing condition if the aggregate measure determined in step 706 exceeds a predetermined and/or configurable threshold level. If the PLC application determines that the spectral content is not indicative of an electrical arcing condition, then the method 700 proceeds to step 712, where the PLC application fits the results stored in step 708 in a data store to a trend model that reflects the behavior of the voltage readings, spectral content, and/or aggregate measure associated with the site 104 over time. In some embodiments, the PLC application may fit the stored results to the trend model via a linear least squares technique. If the PLC application determines that the trend of the spectral content and/or aggregate measure is indicative of an electrical arcing condition, then the method 700 proceeds to step 716, where the PLC application performs one or more remedial operations.

At step 714, the PLC application determines whether the trend of the voltage readings is indicative of an electrical arcing condition or an increase in electrical arcing over a duration of time. In making this determination, the PLC application may use any technically feasible approach. In one example, the PLC application could determine that the trend model of the voltage readings is indicative of an electrical arcing condition if the slope of the trend model exceeds a predetermined and/or configurable threshold level, such as 1.0, 1.1, 1.2, and so on. Additionally or alternatively, the PLC application could determine that the trend of the voltage readings is indicative of an electrical arcing condition if the slope of the trend exceeds a predetermined and/or configurable trend threshold level and one or more components of the frequency spectrum exceed a predetermined and/or configurable frequency spectral threshold.

If, at step 714, the PLC application determines that the trend is not indicative of an electrical arcing condition, then the method 700 proceeds to step 702, described above. If, on the other hand, the PLC application determines that the trend is indicative of an electrical arcing condition, then the method 700 proceeds to step 716, where the PLC application performs one or more remedial operations.

At step 716, the one or more remedial operations are based on at least one of the spectral content of the frequency spectrum and a trend analysis of the frequency spectrum, which are further based on the voltage readings. In one example, the PLC application could report the potential electrical arcing condition to the edge device 108, to a central server in a central office 106, and/or to one or neighboring network communications devices 102. In another example, the PLC application could transmit a portion of the voltage readings after the high-pass filter to the edge device 108, to a central server in a central office 106, and/or to one or neighboring network communications devices 102. In yet another example, the PLC application could transmit the spectral content of the frequency spectrum and/or the aggregation measure to the edge device 108, to a central server in a central office 106, and/or to one or neighboring network communications devices 102. In yet another example, the PLC application could generate an alert to a user associated with the site 104 to inform the user of the electrical arcing condition. The PLC application could generate the alert via any one or more technically feasible mechanisms, including, without limitation, illuminating an indicator light on the network communications device 102, generating an audio signal such as a siren, generating a computer simulated voice signal announcing the electrical arcing condition, transmitting a text message to the user, sending an email to the user, causing a smart speaker to inform the user of the electrical arcing condition, or transmitting an alert message to a smart watch. In yet another example, the PLC application could disconnect the electrical power to the site 104 to reduce or eliminate the likelihood of fire. After the PLC application performs the one or more remedial operations, the method 700 proceeds to step 702, described above.

As described herein, the PLC application and PLC module perform electrical arcing analysis concurrently with PLC communications transmitting and receiving. Even so, in some embodiments, the method 700 may be suspected during PLC communications because the high-frequency complements of the PLC communications may interfere with the voltage components read during step 702 over the frequencies being analyzed and, as a result, may interfere with electrical arcing detection. Therefore, the PLC application and PLC module may temporarily suspend electrical arcing analysis when receiving and/or sending a PLC message. In that regard, when performing electrical arcing analysis, the PLC application 364 may detect PLC communications, such as a request to receive and/or transmit a message via the PLC modem 366. In such cases, the PLC application 364 suspends electrical arcing analysis prior to completion, switches to PLC communications mode, and processes the PLC communications. After processing the PLC request, the PLC application 364 resumes the electrical arcing analysis mode. In this manner, the PLC application 364 performs electrical arcing analysis with little to no disruption of PLC communications.

In some embodiments, the PLC application 364 and the PLC module 368 may detect electrical arcing occurring on the power utility side, external to the site 104. Consequently, an electrical arcing condition occurring at one site 104 may be detected by multiple network communications devices 102 in addition to the network communications device 102 at the site 104. In such embodiments, the network communications devices 102 may exchange data associated with the electrical arcing condition. For example, if four network communications devices 102 detect a voltage anomaly, the four meters may exchange the magnitude of the voltage anomaly. The network communications device 102 that observed the highest magnitude of the voltage anomaly is likely associated with the site 104 where the electrical arc occurred. In this manner, each of the network communications devices 102 may differentiate electrical arcing conditions occurring within the corresponding site 104 from electrical arcing conditions occurring at other sites 104.

In sum, a network communications device with PLC capability is configured to perform electrical arcing detection. The network communications device acquires voltage readings in the form of waveform data via the PLC transceiver for own or more circuits associated with the network communications device. The PLC application analyzes the voltage readings over time to detect electrical arcing conditions. During the analysis, the PLC application correlates and compares these voltage readings over an extended period of time to look for trends indicating that an electrical arcing condition is developing in one or more circuits.

At least one technical advantage of the disclosed techniques relative to the prior art is that electrical arcing can be detected for an entire site, such as a household or other building structure, from a single location. Thus, with the disclosed techniques, a residence or other building structure can be protected from electrical arcing without having to replace all circuit breakers within the structure with AFCI-type circuit breakers. Another technical advantage relative to the prior art is that, with the disclosed techniques, is that, by analyzing a frequency spectrum derived from voltage readings over sequential time periods, electrical arcing conditions that develop slowly over time can be detected. By contrast, conventional current-based arc-fault circuit interrupters only detect only sudden, high-magnitude electrical arcing, are unable to analyze such long-term electrical arcing conditions. These technical advantages represent one or more technological advancements over prior art approaches.

1. In some embodiments, a computer-implemented method for detecting electrical arcing in an electrical system comprises: acquiring, via a first power line communications (PLC) modem, first voltage readings associated with an electrical circuit; performing one or more operations based on the first voltage readings to determine that an electrical arcing condition is present within the electrical circuit; and performing a remedial operation in response to determining that the electrical arcing condition is present.

2. The computer-implemented method according to clause 1, wherein the one or more operations comprise detecting that a plurality of voltage values included in the first voltage readings has at least one high-frequency signal component.

3. The computer-implemented method according to clause 1 or clause 2, wherein the one or more operations comprise: generating a frequency spectrum from the first voltage readings; and determining that a spectral component of the frequency spectrum exceeds a threshold level.

4. The computer-implemented method according to any of clauses 1-3, wherein the one or more operations further comprise: generating an aggregate measure of spectral content of the frequency spectrum in a frequency range of interest; and determining that the aggregate measure exceeds a threshold level.

5. The computer-implemented method according to any of clauses 1-4, wherein the one or more operations further comprise: fitting at least one of the spectral content or the aggregate measure to a trend model that reflects behavior of the at least one of the spectral content or the aggregate measure over a period of time; and determining, based on the trend model, that a trend of the at least one of the spectral content or the aggregate measure is indicative of an electrical arcing condition.

6. The computer-implemented method according to any of clauses 1-5, wherein the first voltage reading is associated with a first site, and wherein the one or more operations comprise: receiving, via a network communications device, second voltage readings associated with a second site; determining that the second voltage readings correspond to the first voltage readings; comparing a first value included in the first voltage readings with a second value included in the second voltage readings; determining that the first value exceeds the second value; and in response, determining that the electrical arcing condition is associated with the first site and not with the second site.

7. The computer-implemented method according to any of clauses 1-6, further comprising: identifying, based on a load pattern, a load that is operating during the electrical arcing condition; and associating the load with the electrical arcing condition.

8. The computer-implemented method according to any of clauses 1-7, further comprising: detecting communications via the PLC modem; suspending the one or more operations to determine that an electrical arcing condition is present; processing the communications with the PLC modem; and resuming the one or more operations to determine that an electrical arcing condition is present.

9. The computer-implemented method according to any of clauses 1-8, wherein the remedial operation comprises disconnecting the electrical circuit from an electrical utility via a service disconnect.

10. The computer-implemented method according to any of clauses 1-9, wherein the remedial operation comprises transmitting the first voltage readings to a central office, an edge device, or another network communications device.

11. The computer-implemented method according to any of clauses 1-10, wherein the remedial operation comprises transmitting a first message to a central office, an edge device, or another network communications device indicating that the electrical arcing condition has been detected.

12. The computer-implemented method according to any of clauses 1-11, wherein the remedial operation comprises generating an alert to inform a user of the electrical arcing condition.

13. In some embodiments, one or more non-transitory computer-readable media store program instructions that, when executed by one or more processors, causes the one or more processors to perform the steps of: acquiring first voltage readings associated with an electrical circuit; performing, via a first power line communications (PLC) transceiver, one or more operations based on the first voltage readings to determine that an electrical arcing condition is present within the electrical circuit; and performing a remedial operation in response to determining that the electrical arcing condition is present.

14. The one or more non-transitory computer-readable media according to clause 13, wherein the one or more operations comprise detecting that a plurality of voltage values included in the first voltage readings has at least one high-frequency signal component.

15. The one or more non-transitory computer-readable media according to clause 13 or clause 14, wherein the one or more operations comprise: generating a frequency spectrum from the first voltage readings; and determining that a spectral component of the frequency spectrum exceeds a threshold level.

16. The one or more non-transitory computer-readable media according to any of clauses 13-15, wherein the one or more operations further comprise: generating an aggregate measure of spectral content of the frequency spectrum in a frequency range of interest; and determining that the aggregate measure exceeds a threshold level.

17. The one or more non-transitory computer-readable media according to any of clauses 13-16, wherein the one or more operations further comprise: fitting at least one of the spectral content or the aggregate measure to a trend model that reflects behavior of the at least one of the spectral content or the aggregate measure over a period of time; and determining, based on the trend model, that a trend of the at least one of the spectral content or the aggregate measure is indicative of an electrical arcing condition.

18. The one or more non-transitory computer-readable media according to any of clauses 13-17, wherein the first voltage readings are associated with a first site, and wherein the one or more operations comprise: receiving, via a network communications device, second voltage readings associated with a second site; determining that the second voltage readings correspond to the first voltage readings; comparing a first value included in the first voltage readings with a second value included in the second voltage readings; determining that the first value exceeds the second value; and in response, determining that the electrical arcing condition is associated with the first site and not with the second site.

19. The one or more non-transitory computer-readable media according to any of clauses 13-18, wherein the steps further comprise: identifying, based on a load pattern, a load that is operating during the electrical arcing condition; and associating the load with the electrical arcing condition.

20. In some embodiments, a system comprises: a memory that includes instructions, and a processor that is coupled to the memory and, when executing the instructions, is configured to: acquire, via a power line communications (PLC) device, first voltage readings associated with an electrical circuit; perform one or more operations based on the first voltage readings to determine that an electrical arcing condition is present within the electrical circuit; and perform a remedial operation in response to determining that the electrical arcing condition is present.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present invention of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method comprising:

receiving, by a network device, first voltage or current readings associated with a first power cycle;

receiving, by the network device, second voltage or current readings associated with a second power cycle;

determining, by the network device, in response to a slope of a trend model determined from the first voltage or current readings and the second voltage or current readings being above a threshold, that an electrical arcing condition is occurring; and performing, by the network device, a remedial operation in response to determining that the electrical arcing condition is present.

2. The method of claim 1, further comprising:

generating, by the network device, a frequency spectrum of the first voltage or current readings; and further determining, by the network device, that the electrical arcing condition is present in response determining that a spectral component of the frequency spectrum exceeds a threshold level.

3. The method of claim 1, further comprising:

generating, by the network device, a frequency spectrum of the first voltage or current readings; and generating, by the network device, an aggregate measure of spectral content of the frequency spectrum in a frequency range of interest; and further determining, by the network device, that the electrical arcing condition is present in response to determining that the aggregate measure exceeds a threshold level.

4. The method of claim 1, further comprising:

fitting the first voltage or current readings and the second voltage or current readings to the trend model.

5. The method of claim 1, wherein the first voltage or current readings are associated with a first site, and wherein the method further comprises:

receiving, by the network device, third voltage or current readings associated with a second site;

determining, by the network device, that the third voltage or current readings correspond to the first voltage or current readings; and determining, by the network device, whether the electrical arcing condition is associated with the first site or the second site by comparing the first voltage or current readings with the third voltage or current readings.

6. The method of claim 1, further comprising:

identifying, by the network device based on a load pattern, a load that is operating during the electrical arcing condition; and associating, by the network device, the load with the electrical arcing condition.

7. The method of claim 1, wherein the remedial operation comprises disconnecting an electrical circuit from an electrical utility.

8. The method of claim 1, wherein the remedial operation comprises transmitting the first voltage or current readings or a message indicating that the electrical arcing condition has been detected to another device.

9. The method of claim 1, wherein the remedial operation comprises generating an alert to inform a user of the electrical arcing condition.

10. One or more non-transitory computer-readable media storing program instructions that, when executed by one or more processors, causes the one or more processors to perform operations comprising:

receiving first voltage or current values measured on an electrical circuit during a first power cycle;

receiving second voltage or current values measured on the electrical circuit during a second power cycle;

determining, in response to a slope of a trend model determined from the first voltage or current readings and the second voltage or current readings being above a threshold, that an electrical arcing condition is occurring in the electrical circuit; and performing one or more remedial actions in response to determining that the electrical arcing is occurring in the electrical circuit.

11. The one or more non-transitory computer-readable media of claim 10, wherein the operations further comprise:

determining a frequency spectrum of the first voltage or current values and the second voltage or current values; and further determining that the electrical arcing is occurring in the electrical circuit in response to determining that a spectral component of the frequency spectrum exceeds a threshold level.

12. The one or more non-transitory computer-readable media of claim 10, wherein:

the electric circuit is located at a first site; and determining that the electrical arcing is occurring in the electric circuit comprises:

receiving third voltage or current values measured on a second electrical circuit at a second site; and comparing the first voltage or current values with the third voltage or current values.

13. The one or more non-transitory computer-readable media of claim 10, wherein the first voltage values are associated with a line-to-line voltage or a line to neutral voltage.

14. The one or more non-transitory computer-readable media of claim 10, wherein the first power cycle and the second power cycle are power cycles that occur when the electrical circuit is not being used for power line communications.

15. The one or more non-transitory computer-readable media of claim 10, wherein the one or more remedial actions comprises at least one of:

disconnecting the electrical circuit from an electrical utility;

transmitting the first voltage or current readings to a central office or an edge device;

transmitting a message indicating that the electrical arcing is occurring to the central office or the edge device; or generating an alert to inform a user that the electrical arcing is occurring.

16. A utility monitoring device, comprising:

one or more processors, and a memory storing instructions that, when executed by the one or more processors, cause the one or more processors to perform operations comprising:

receiving first voltage or current measurements for an electrical circuit during a first power cycle;

receiving second voltage or current measurements for the electrical circuit during a second power cycle;

determining, in response to a slope of a trend model determined from the first voltage or current measurements and the second voltage or current measurements being above a threshold, that electrical arcing is occurring in the electrical circuit; and performing a remedial action in response to determining that there is electrical arcing in the electrical circuit.

17. The utility monitoring device of claim 16, wherein determining that electrical arcing is occurring in the electrical circuit comprises:

determining a first frequency spectrum of the first voltage or current measurements;

determining a second frequency spectrum of the second voltage or current measurements; and fitting the first frequency spectrum and the second frequency spectrum to the trend model.

18. The utility monitoring device of claim 16, wherein the operations further comprise:

identifying, based on a load pattern, a load that is powered by the electrical circuit while there is electrical arcing in the electric circuit; and identifying the load as a source of the electrical arcing.

19. The utility monitoring device of claim 16, further comprising:

a power line communications component;

wherein the first voltage or current readings are received from the power line communications component.

* * * * *